Aug. 17, 1965 W. BILLI 3,201,204
FURNACE APPARATUS FOR PRODUCING ACETYLENE FROM METHANE
Filed July 25, 1961

3,201,204
FURNACE APPARATUS FOR PRODUCING
ACETYLENE FROM METHANE
Walter Billi, Milan, Italy, assignor to Montecatini Società
Generale per l'Industria Mineraria e Chimica, Milan,
Italy
Filed July 25, 1961, Ser. No. 126,716
Claims priority, application Italy, Aug. 30, 1960,
15,243/60
4 Claims. (Cl. 23—277)

My invention relates to a furnace device and method for the pyrolytic production of acetylene by thermal decomposition of hydrocarbons, particularly methane or other methane-rich hydrocarbons.

Such cracking by partial combustion requires separately preheating the methane or other hydrocarbon and the oxygen, then mixing them, and igniting the mixture to obtain flaming. In order to obtain maximum yields in the transformation of hydrocarbon to acetylene, the flame must be ignited in the presence of a structure which secures an effective separation of the mixing chamber from the combustion chamber of the furnace. This separating member, consisting of a block or plate and commonly called a gas distributor also should allow good combustion of the hydrocarbon-oxygen mixture.

Good combustion for the purpose of acetylene production is obtained when the ignition of the mixture takes place simultaneously at all points of the mixture travelling along and past the separating block. Since the mixture at the moment it enters the block, has not yet good flame-forming characteristics, the block also serves to allow the mixture to meet all those requirements, by making it uniform at all points and at the same time.

Most separating blocks or plates heretofore in use consist of numerous parallel tubes or channels through which the mixture passes downwardly from the mixing chamber to the combustion chamber at a speed higher than that of the flame to pass backward from the combustion chamber into the mixing chamber. When leaving the separating block or plate in the downward direction, the hydrocarbon-oxygen mixture impinges on a portion of already burnt gases which tend to move upward. This increase the temperature of the mixture and thus ignites the mixture as it arrives at the entrance of the combustion chamber.

To promote the ignition of the mixture at the lower end of the separating block, auxiliary nozzle devices for injecting a supplementary amount of oxygen are often provided. The heat developed by ignition at the entering points of the supplementary oxygen, increases the temperature of the combustible mixture in proximity to the oxygen supply, thus stabilizing the combustion in the furnace zone below the block. Generally, the more uniformly the supplementary amount of oxygen is injected, and the higher the whirling movements are within the gaseous mixture to be burned, the more effective is the separating block.

It is an object of my invention, relating to such acetylene-producing methods and devices, to further increase the stability of combustion so as to improve the reliability of the pyrolytic operation as well as the yield in acetylene.

I have discovered, in accordance with a feature of my invention, that these improvements are realized by providing the furnace, in lieu of a separating block, with one or more gas-distributor devices which cause the flame to assume a particular shape by forming between the mixing chamber and the reaction chamber of the furnace a passage or conduit structure having a widened middle portion of bulbous shape partly filled by a hollow throttling and shielding body of metal or other thermally good conducting material which is likewise of generally bulbous shape and leaves a ring-shaped passage for the gaseous mixture, the interior of the body being in communication with cooling ducts for passing a fluid coolant, preferably water, through the hollow body to maintain it at a temperature lower than the arriving temperature of the preheated gas mixture.

The foregoing and more specific objects, advantages and features of my invention, said features being set forth with particularity in the claims annexed hereto, will be apparent from, and will be mentioned in, the following with reference to the embodiment of furnace apparatus according to the invention illustrated by way of example on the accompanying drawings in which:

Figure 1:
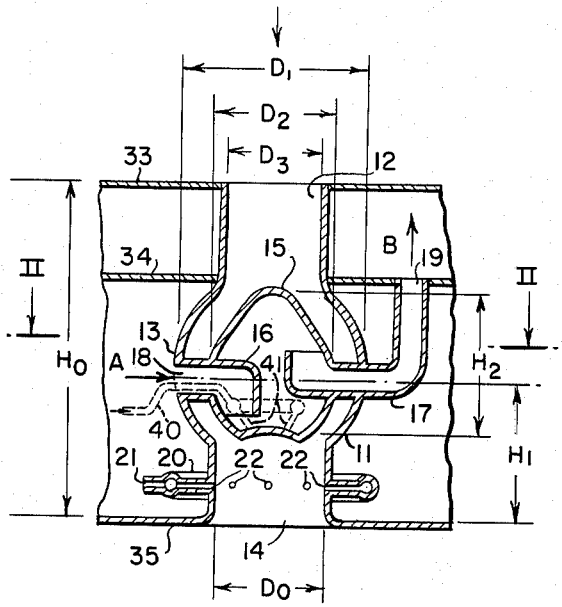
FIG. 1 shows one of the distributor devices of the invention in vertical section.
Figure 2:
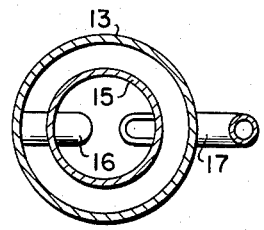
FIG. 2 is a cross section of the same device along the line denoted by II—II in FIG. 1.

The illustrated distributor device consists essentially of a conduit structure 11 which, when mounted in the furnace, has a vertical axis. The preheated gas mixture arrives from above through the inlet portion 12 of the conduit and passes through the outlet portion 14 into the reaction chamber of the furnace. The middle portion 13 coaxially between the inlet and outlet portions 12 and 14, has a wider cross section and generally bulbous shape. A generally spheroidal or bulbous baffle body 15 is mounted centrally within the wide middle portion 13 of the conduit structure.

The diameter D0 of the conduit structure 11 at the outlet 14, the diameter D1 at the largest width of the middle portion 13, the diameter D2 of the shield or baffle body 15, and the diameter D3 of the inlet portion 12 where the mixture passes into the conduit structure, are preferably related to each other as follows:

$$2\ D0 > D1 > 1.2\ D0$$
$$1.9\ D0 > D2 > 1.1\ D0$$
$$1.2\ D0 > D3 > 0.5\ D0$$

The diameter D0 of the conduit 11 at the lower end 14, the total height H0 of the conduit 11, the height H1 of the greatest width of the middle portion 13, and the height H2 of the baffle shield 15 are preferably interrelated as follows:

$$10\ D0 > H0 > 2\ D0$$
$$3\ D0 > H1 > 0.8\ D0$$
$$3\ D0 > H2 > 0.8\ D0$$

The central baffle 15 is held in place by two or more radial ducts 16 and 17 rigidly joined with the walls of the main conduit 11. During operation a cooling fluid, for example water, is passed through the inlet opening 18 of duct 16 and the outlet opening 19 of duct 17, the flow direction being indicated by arrows A and B.

The lower, outlet portion 14 of the duct structure 11 is surrounded by a ring conduit 20 which has an inlet duct 21 for the supply of supplemental oxygen. The annular conduit 20 is provided with radial nozzle pipes. These are peripherally distributed about the conduit portion 14 and communicate with its interior through nozzle orifices 22 for injecting supplementary oxygen into the gas mixture to reliably ignite a flame at this location. It is likewise possible and in some cases advisable, if D0 is wide enough, to provide a pipe 40 through nozzle pipes 41 for injecting auxiliary oxygen from cenrtal baffle 15, as shown in FIG. 1 by dotted lines.

Figure 3:
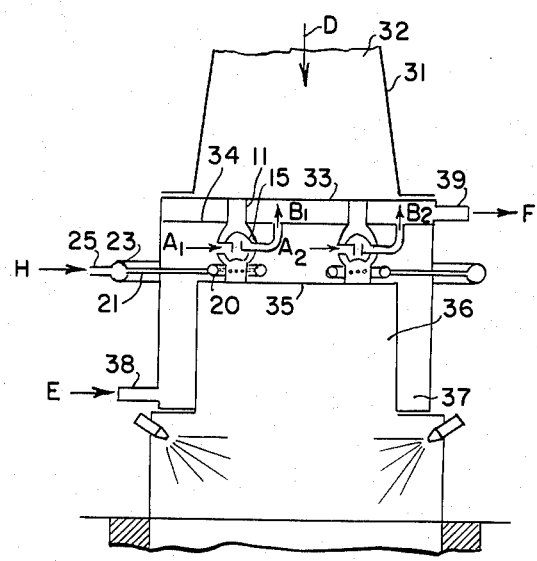
FIG. 3 shows schematically in vertical section an acetylene producing furnace equipped with distributor devices according to FIGS. 1 and 2.

The position of one or more of the distributor devices illustrated in FIG. 1, relative to the reaction chamber and the conduit for the supply of the mixture to be cracked, is apparent from FIG. 3. The mixing chamber, or its duct portion leading to the distributor area of the furnace, is denoted by 31. The mixture of preheated gases arrives through the inlet opening 32 in the direction indicated by an arrow D. The mixer duct 31 is separated from the reaction chamber 36 by three horizontal partitions denoted by 33, 34 and 35. The reaction chamber 36 proper is surrounded by a cooling jacket 37 which is supplied with fluid coolant, preferably water, through an inlet duct 38. The coolant passes through the space between the partitions 34 and 35 and through the interior of the baffle bodies 15 of the distributor devices whence it passes into the space between the partitions 33 and 34, leaving the furnace through an outlet duct 39. The flow direction of the coolant is denoted generally by arrows E and F, and the flow direction of the coolant through the illustrated distributor devices is denoted by $A_1$, $B_1$ and $A_2$, $B_2$. The above-described inlet pipe 21 for the supply of supplementary oxygen to each distributor unit is connected to a ring-shaped dispensing pipe 23, which receives a supply of oxygen through one or more supply pipes 25.

The baffle shield 15 and the conduit structure 11 for supplying the gaseous mixture, as well as the walls of the reaction chamber 36, are made of a material of high thermal conductivity, preferably stainless steel, for effective cooling by circulation of a cooling fluid as described above.

The temperature of these sheet-steel members during operation of the furnace should preferably not exceed 300° C. since, for maintaining the desired shape of the flame caused by the whirling motion imparted thereto by the bulbous shape of the conduit portion 13 and the baffle body 15, the thin streamlines of gas passing along the surface of the device must be colder than the remainder of the mixture to be cracked, the temperature of this mixture being generally higher than 400° C. That is, a temperature difference between the surface of the body 15 and the adjacent layer of gaseous mixture should be maintained at a value of at least about 100° C.

This particular precaution makes it possible to preserve the whirling motion previously imparted to the gas mixture, because the lines or filaments of fluid flow along the surface of the distributor device attain the ignition temperature with a slight delay relative to the remaining portion of the gas and, therefore, retain the kinetic energy needed for maintaining the flame in turbulence. The throttling and shielding hollow body in devices according to the invention not only stabilizes the whirling movements of the mixture to be cracked, thus favoring good combustion, but also prevents heat radiation from the combustion chamber 36 toward the mixing zone. This eliminates one of the causes of premature reactions which may occur with the known devices due to the catalytic activity of the luminous radiations of the flame.

The good results obtainable by virtue of the invention are illustrated by the following examples.

*Example 1*

Used was a furnace originally provided with a conventional refractory distributor block or plate and having a rated capacity of 2000 Nm.³/hour of natural gas containing 98% of $CH_4$ and operating at 2 atmospheres (absolute). The conventional refractory distributor plate was substituted by a device according to the invention as described above. The device was cooled by water circulation to maintain the shield surface at a temperature of 160° C. Only a single distributor device was used having a diameter of D0 of 100 mm. As a result, an increase by 5% in acetylene yield was obtained, compared with the yield obtained before applying the device according to the invention, all other operating conditions (oxygen flow rate, methane rate, preheating temperature, quenching water flow rate, etc.) remaining the same.

*Example 2*

A furnace was used which originally had a conventional refractory burner plate, a rated capacity of 4000 Nm.³/hour of natural gas containing 98% of methane, operating at a pressure of 4 atmospheres (absolute). The refractory burner plate was substituted by a distributor device according to the invention as described above. The device was cooled by circulating water to a temperature of 145° C. Seven such distributor devices were used in parallel, each having a diameter D0 of 30 mm. This resulted in an increase by 6% in acetylene yield as compared with that obtained before applying the device according to the invention, all other operating conditions (oxygen flow rate, methane flow rate, preheating temperature, quenching water flow rate, etc.) remaining the same.

It will be obvious to those skilled in the art, upon a study of this disclosure, that my invention permits of various modifications with respect to design and shape of the distributor units and hence can be given embodiments other than particularly illustrated and described herein, without departing from the essential features of my invention and within the scope of the claims annexed hereto.

I claim:

1. A furnace for pyrolytic production of acetylene from hydrocarbons, having a gas mixing chamber and a combustion chamber and distributor means forming a passage between said gas mixing chamber and said combustion chamber, said distributor means comprising a conduit structure through which said gas mixing chamber communicates with said combustion chamber, said conduit structure having a middle portion wider than the end portions, a throttling shield centrally mounted in said middle portion and forming together therewith an annular passage around said shield, said shield consisting of a hollow metal body and duct means communicating with the interior of said body to pass fluid coolant therethrough to maintain, when in operation, the gas-contacted surface of the body at a temperature at least 100° C. lower than the arriving temperature of the gas mixture to be cracked.

2. A furnace for pyrolytic production of acetylene from hydrocarbons, having a gas mixing chamber and a combustion chamber and distributor means forming a passage between said gas mixing chamber and said combustion chamber, said distributor means comprising a conduit structure through which said gas mixing chamber communicates with said combustion chamber, said conduit structure having two coaxially aligned tubular end portions adjacent said gas mixing chamber and combustion chamber respectively, the diameter of the end portion adjacent said combustion chamber being greater than 0.5 and less than 1.2 times the diameter of the end portion adjacent said gas mixing chamber, and having a bulbous middle portion of a diameter greater than 1.2 and less than 2.0 times the diameter of the end portion adjacent said gas mixing chamber, a hollow metal bulbous coaxially mounted in said middle portion and having an outer diameter smaller than said inner diameter of said middle portion so as to form an annular passage around said body, and coolant duct means extending from the outside through said middle portion and communicating with the interior of said body to pass fluid coolant therethrough.

3. A furnace for pyrolytic production of acetylene from hydrocarbons, having a gas mixing chamber and a combustion chamber and distributor means forming a passage between said gas mixing chamber and said combustion chamber, said distributor means comprising a conduit structure through which said gas mixing chamber communicates with said combustion chamber, said conduit structure having two coaxially aligned tubular end portions adjacent said gas mixing chamber and combustion chamber respectively and having a bulbous middle portion of larger inner diameter than said end portions, a hollow meatl body of bulbous shape coaxially mounted in said middle portion and having an outer diameter smaller than said inner diameter of said middle portion so as to form an annular passage around said body, a coolant jacket surrounding said distributor, coolant duct means extending from said collant jacket through said middle portion and communicating with the interior of said body to pass fluid coolant therethrough, nozzle ducts peripherally distributed and directly inwardly on said end portion adjacent to said combustion chamber, and oxygen supply means connected to said nozzle ducts for passing supplemental oxygen into said latter end portion.

4. A furnace for pyrolytic production of acetylene from methane-rich hydrocarbons, comprising a furnace structure having a gas mixing chamber and a combustion chamber, a cooling jacket around said combustion chamber, at least one distributor device forming a conduit structure through which said mixing chamber communicates with said reaction chamber, said conduit structure having a bulbous middle portion wider than the end portion of said conduit structure, a hollow bulbous metal heat-conducting body mounted in said middle portion and forming therewith an annular passage around said body, coolant passage means through which the interior of said cooling jacket communicates with the interior of said body, and duct means for passing cooling water serially through said jacket and body.

References Cited by the Examiner
UNITED STATES PATENTS

| | | | |
|---|---|---|---|
| 2,377,847 | 6/45 | Allen et al. | 260—679 X |
| 2,572,338 | 10/51 | Hartwig et al. | 23—284 |
| 2,719,184 | 9/55 | Kosbahn et al. | 260—679 |
| 2,822,411 | 2/58 | Braconier et al. | 260—679 |

MORRIS O. WOLK, *Primary Examiner.*
ALPHONSO D. SULLIVAN, *Examiner.*